United States Patent [19]

Webb

[11] Patent Number: 5,771,683

[45] Date of Patent: Jun. 30, 1998

[54] ACTIVE POROUS MEDIUM AFTERTREATMENT CONTROL SYSTEM

[75] Inventor: Cynthia Chaffin Webb, San Antonio, Tex.

[73] Assignee: Southwest Research Institute, San Antonio, Tex.

[21] Appl. No.: 521,310

[22] Filed: Aug. 30, 1995

[51] Int. Cl.⁶ .................................................. F01N 3/20
[52] U.S. Cl. .............................. 60/274; 60/284; 60/286; 60/288; 60/297; 60/303
[58] Field of Search ............................ 60/303, 288, 284, 60/286, 274, 297

[56] References Cited

U.S. PATENT DOCUMENTS

| | | | |
|---|---|---|---|
| 2,946,651 | 7/1960 | Houdry | 60/288 |
| 2,956,865 | 10/1960 | Williams | 60/303 |
| 4,383,411 | 5/1983 | Riddel | 60/303 |
| 4,481,767 | 11/1984 | Stark | 60/303 |
| 4,485,621 | 12/1984 | Wong et al. | 60/274 |
| 4,502,278 | 3/1985 | Stark | 60/303 |
| 4,531,363 | 7/1985 | Ludecke et al. | 60/303 |
| 4,535,589 | 8/1985 | Yoshida et al. | 60/303 |
| 4,538,413 | 9/1985 | Shinzawa et al. | 60/303 |
| 4,557,108 | 12/1985 | Torimoto | 60/286 |
| 4,571,938 | 2/1986 | Sakurai | 60/303 |
| 4,622,811 | 11/1986 | Distel et al. | 60/303 |
| 4,662,172 | 5/1987 | Shinzawa et al. | 60/303 |
| 4,671,058 | 6/1987 | Yoshida et al. | 60/303 |
| 4,716,725 | 1/1988 | Dettling et al. | 60/303 |
| 4,731,994 | 3/1988 | Dettling et al. | 60/303 |
| 4,732,594 | 3/1988 | Mizrah et al. | 55/523 |
| 4,736,584 | 4/1988 | Leistritz | 60/303 |
| 4,741,156 | 5/1988 | Buchner | 60/303 |
| 4,744,216 | 5/1988 | Rao et al. | 60/303 |
| 4,788,819 | 12/1988 | Henkel | 60/303 |
| 4,840,028 | 6/1989 | Kusuda et al. | 60/303 |
| 4,912,920 | 4/1990 | Hirabayashi | 60/303 |
| 4,934,141 | 6/1990 | Ollivon et al. | 60/275 |
| 4,955,183 | 9/1990 | Kolodzie et al. | 60/303 |
| 4,982,565 | 1/1991 | Projahn | 60/303 |
| 4,991,396 | 2/1991 | Goerlich et al. | 60/303 |
| 5,001,899 | 3/1991 | Santiago et al. | 60/274 |
| 5,014,511 | 5/1991 | Wade et al. | 60/303 |
| 5,031,401 | 7/1991 | Hinderks | 60/302 |
| 5,038,562 | 8/1991 | Goerlich | 60/274 |
| 5,051,244 | 9/1991 | Dunne et al. | 423/212 |
| 5,053,062 | 10/1991 | Barris et al. | 55/282 |
| 5,074,112 | 12/1991 | Walton et al. | 60/275 |
| 5,094,075 | 3/1992 | Berendes | 60/303 |
| 5,101,095 | 3/1992 | Wagner et al. | 219/205 |
| 5,103,641 | 4/1992 | Maus et al. | 60/299 |
| 5,105,621 | 4/1992 | Simmons et al. | 60/303 |
| 5,138,836 | 8/1992 | Pfister | 60/311 |
| 5,140,814 | 8/1992 | Kreutmair et al. | 60/303 |
| 5,353,590 | 10/1994 | Pettit | 60/303 |
| 5,379,592 | 1/1995 | Waschkuttis | 60/303 |
| 5,419,121 | 5/1995 | Sung | 60/303 |

OTHER PUBLICATIONS

C. Chaffin, M. Koenig, M. Koeroghlian, R.D. Matthews, M.J. Hall, and S.P. Nichols; "Experimental Investigation of Premixed Combustion Within Highly Porous Media." Presented at the 1991 Spring AFRC Meeting; Hartford, CT; Mar. 1991.

Ronald D. Bell, C. Chaffin, and M. Koeroghlian; "Experimental Investigation of a Staged Porous Ceramic Burner"; Univ. of Texas; Austin, TX; May 1991.

*Primary Examiner*—Douglas Hart
*Attorney, Agent, or Firm*—Jenkens & Gilchrist

[57] ABSTRACT

An improved auxiliary heat source for use in an engine cold start emission reduction system includes a flame containment chamber having at least one wall formed of a porous foam material that confines the flame within a predetermined chamber while permitting heat therefrom to emerge and flow to an exhaust system catalyst or, in the case of diesel engines, a particulate trap.

14 Claims, 2 Drawing Sheets

ACTIVE POROUS MEDIUM AFTERTREATMENT CONTROL SYSTEM

BACKGROUND OF THE INVENTION

1. Technical Field

This invention relates to internal combustion engine exhaust burner systems and more particularly to such systems that include provisions for adding energy to existing catalyst systems during cold-start of a vehicle.

2. Description of the Related Art

It is well known that hydrocarbon emissions are potentially harmful to the environment and the health of persons within that environment. Moreover, incomplete combustion products such as carbon monoxide, are highly toxic and are particularly troublesome. Internal combustion engines have been a major source of unburned hydrocarbons and have been a substantial contributor to the well known smog problems encountered in many metropolitan areas.

A variety of proposals have been made for reducing levels of unburned hydrocarbons emitted by automobiles. Thus, there are now included in conventional automobile exhaust systems catalytic converters which, when operating at elevated temperatures, are highly effective in oxidizing unburned hydrocarbons and thus reducing harmful effects of exhaust emissions on the environment and on persons subjected to such environment. However, when a typical internal combustion engine is first started, it and its exhaust system normally are cold; and until both heat to operating temperatures, unburned hydrocarbons and carbon monoxide pass through the inactive catalyst, unoxidized.

During cold start of a typical internal combustion engine, a high concentration of unburned hydrocarbons are emitted. However, conventional exhaust system catalysts are insufficiently hot to catalyze such hydrocarbons and typically remain at least partially inactive for approximately 60 seconds after start-up due to insufficient engine exhaust heat to achieve catalyst light-off. Accordingly, during such warm-up periods, the exhaust pollutants (including unburned hydrocarbons) produced by the engine pass through the catalyst without being reacted and consequently pass into the atmosphere.

The present invention is directed to solving the problems associated with uncatalyzed exhaust emission during start-up of an internal combustion engine. It is desirable to have a system for providing a flow of heated gas directly to the catalyst upon start-up of the engine to quickly raise the temperature of the catalyst to its operating, or light-off, temperature thereby reducing the time that the engine is emitting uncatalyzed exhaust products. It is also desirable to have such a system whereby the heated gas for raising the temperature of the catalyst is provided by a flame confined within a chamber interposed an exhaust port of the engine and the catalyst. Furthermore, it is desirable to have such a chamber that has at least one porous wall allowing passage of the heated gas to the catalyst but inhibiting extension of the flame beyond the chamber. Still further, it is desirable to have such a porous wall that provides a substantially uniform temperature distribution across the flow of heated gas directed to the catalyst to prevent localized areas of excessive heat which could damage the catalyst.

SUMMARY OF THE INVENTION

In accordance with one aspect of the present invention a system for controlling undesirable emissions in gases exhausted from an internal combustion engine during cold start-up of the engine includes an exhaust gas treatment member that is positioned between an exhaust port of the engine and the environment external of the engine, and a chamber interconnected with the gas treatment member at a position between the engine exhaust port and the treatment member. The chamber has a fueled burner disposed therein that provides a flame when the engine is started from a cold condition, and a porous foam member that defines at least one wall surface of the chamber. The foam member is positioned between the fueled burner and the exhaust gas treatment member and simultaneously provides confinement of the flame within the chamber and passage of gases heated by the flame to the exhaust gas treatment member.

Other aspects of the present invention include the chamber being disposed in either serial or parallel arrangement with the exhaust port of the engine and the gas treatment, and the porous foam member being formed of a ceramic material such as zirconia, alumina, silicon nitride or silicon carbide.

In accordance with another aspect of the present invention, a cold start exhaust emission control system for an internal combustion engine an exhaust port includes a catalyst interconnected with the exhaust port, a fueled burner that is positioned between the engine exhaust port and the catalyst and adapted to provide heat to the catalyst coincident with cold start-up of the engine, and a chamber defined by a plurality of wall surfaces and encompassing the fueled burner. The system also has a porous foam member positioned between the fueled burner and the catalyst that defines at least one of the wall surfaces of the chamber. The porous foam member simultaneously provides containment of the fuel within the chamber and a passageway for gases heated by the flame in the chamber to the catalyst.

In accordance with yet another aspect of the present invention, a fueled burner for producing a flame for heating a catalyst in an system for controlling emissions from an internal combustion engine, during cold engine start-up, includes a flame containment chamber having a plurality of walls and a fuel injector extending into the chamber through one of the walls, an ignition device disposed within the chamber, and a porous foam member that defines one of the wall of the chamber and provides a flame holder to confine and stabilize the flame within the chamber.

In accordance with still another aspect of the present invention, a method for improving catalysis of exhaust gases emitted from an internal combustion engine when the engine is cold started includes providing a passageway communicating an exhaust port of the engine with the external environment and disposing an exhaust gas treatment catalyst in the passageway. The method further includes disposing a fueled burner in a chamber having at least one wall formed of porous foam material, the chamber being in fluid communication with the passageway and positioned between the exhaust port of the engine and the exhaust gas treatment catalyst. Fuel and air are delivered to the fueled burner coincidentally with cold starting the engine and the fuel is ignited to form a flame that is confined within the chamber. The flame heats gases with the chamber which pass through the porous foam member whereupon the flame-heated gases are mixed with exhaust gas from the engine, whereupon the mixed flame-heated and exhaust gases are directed through the catalyst.

OBJECTS AND FEATURES OF THE INVENTION

It is an object of the invention to provide an improved means for stabilizing a fuel-fired flame in or parallel to the exhaust of an engine.

It is another object of the invention to reduce thermal shock on a catalyst face when a fueled auxiliary heating flame source is utilized.

It is another object of the invention to reduce internal combustion engine exhaust pulsation effects in auxiliary heating flame chambers.

Accordingly, in accordance with one feature of the invention, a supplementary heating fuel ignition chamber is disposed immediately upstream of a flame-containing foam member, and provision is made for igniting fuel and containing a flame within the ignition chamber, thereby providing an improved supplementary heat source for a catalyst bed when an engine is cold-started.

In accordance with another feature of the invention, the aforementioned foam member preferably is formed of thermal shock and oxidation resistant ceramic material, thereby facilitating its use in a high temperature environment.

In accordance with another feature of the invention, the ceramic foam member may be formed of an electrically conductive ceramic material and provide one of the electrodes in a fuel ignition system.

In accordance with another feature of the invention, the ceramic foam member beneficially enhances fuel vaporization and thereby reduces the sensitivity of the fuel ignition chamber to fuel droplet size.

In accordance with yet another feature of the present invention, the ceramic foam member advantageously provides distribution of the flame and gases heated by the flame substantially uniformly across the face of the foam member, thereby producing a relatively even temperature profile in the post-flame zone.

In accordance with another feature of the invention, when light-off of a conventional catalyst bed is achieved, provision is made for deactivating the supplementary heating while optionally maintaining injection of supplemental air through the foam member, thereby continuing to provide supplemental heat and air to the catalyst and helping prevent the loss of catalyst light-off.

In accordance with still another feature of the invention, the foam member is deployed as a flame holder to contain the supplementary flame within the supplementary heating fuel ignition chamber.

In accordance with yet another feature of the invention, the foam member adds thermal mass to the burner system, thereby reducing the thermal shock on the face of the conventional catalyst.

In accordance with still another feature of the invention, once the foam member is heated, it can aid in the re-ignition of the flame within the ignition chamber if such flame is blown out, thus providing an additional margin of safety and preventing unburned hydrocarbons from escaping the burner.

In accordance with yet another feature of the invention, the foam member acts to dampen exhaust pulsations in the primary burner section, thereby reducing the effects of exhaust flow pulsations.

In accordance with yet one further feature of the invention, the foam member helps to evenly distribute the burner temperature in the post flame zone.

In accordance with still a further feature of the invention, the foam member is made electrically conductive, thus enhancing its effectiveness as part of the supplementary flame ignition system, increasing the ease of ignition, an adding an additional margin of safety.

In accordance with yet one other feature of the invention, by employing a ceramic foam member with large surface areas, fuel vaporization is enhanced, thus contributing to system effectiveness.

These and other objects and features of the invention will be apparent from the following detailed description, by way of preferred examples, with reference to the drawing.

DETAILED DESCRIPTION OF THE INVENTION

Figure 1:
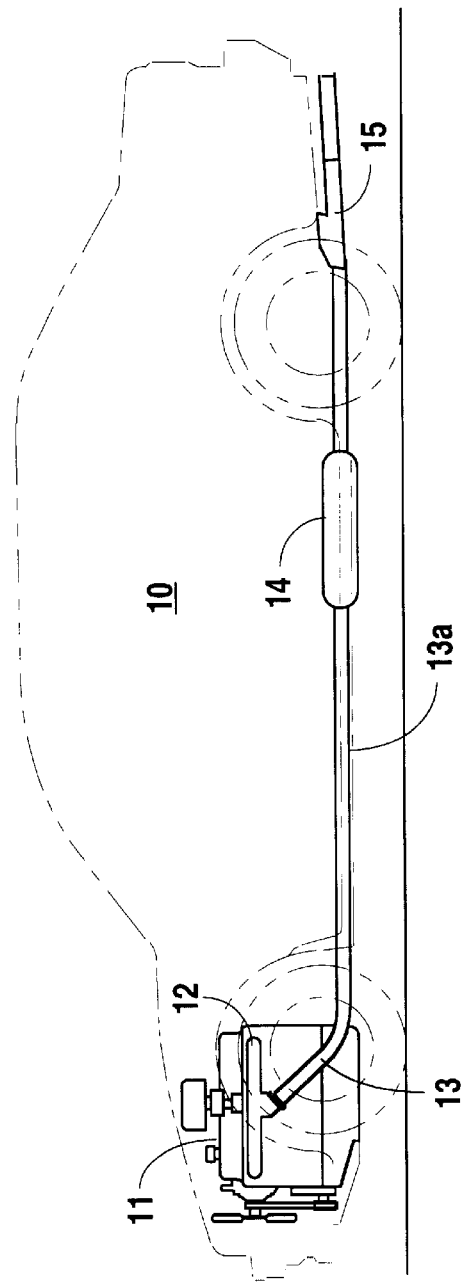
FIG. 1 is a side view, partly in phantom, of a conventional automobile equipped with a conventional exhaust system.

Now turning to the drawing, and more particularly FIG. 1 thereof, it will be seen to depict the phantom outline of a conventional modern automobile 10 having a typical internal combustion engine 11 with an exhaust manifold 12 leading from the exhaust ports of the engine 11. Connected to the exhaust manifold 12 are a header 13 and an exhaust pipe 13a in which there is serially disposed a catalytic converter 14 and a muffler 15. As is well known to those skilled in the art, the purpose of the catalytic converter is to bring about oxidation and reduction of exhaust gas pollutants, principally unburned hydrocarbons, and thereby neutralize their most harmful qualities. However, as mentioned above, when an internal combustion engine is first started from a cold condition, the exhaust downstream components also are ordinarily cold and therefore functionally ineffective to achieve catalysis during the warm-up period which may last as much as sixty seconds before system temperatures rise to a point know as "light-off", a condition that exists when the conventional catalyst temperature has risen to a point at which it is effective to bring about oxidation of unburned exhaust components. When this occurs, the heat of oxidation is added to the heat already existing in the hot exhaust gasses so as to aid in maintaining the conventional catalyst in its "light-off" condition.

Figure 2:
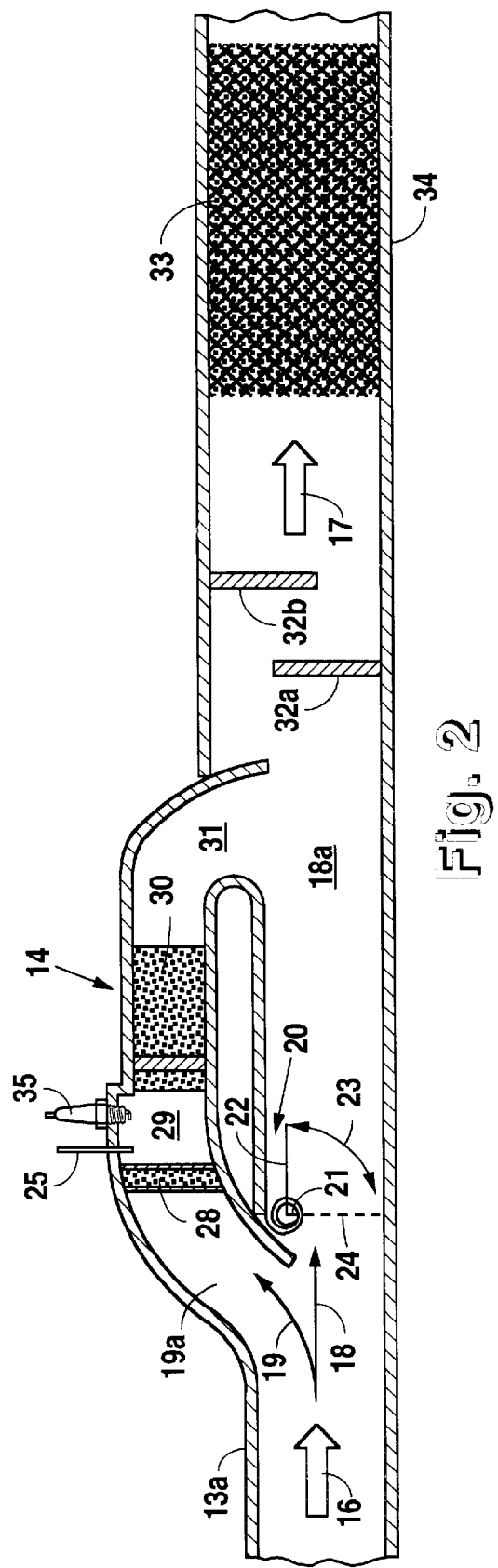
FIG. 2 is a functional schematic view of a part of an embodiment of an internal combustion engine exhaust system embodying the invention.

In order to essentially eliminate emitted unburned hydrocarbons during the warm-up period, and in accordance with a first embodiment of the invention, the apparatus of FIG. 2 is provided. There, in FIG. 2, will be seen the aforementioned exhaust pipe 13a in which raw exhaust gasses flow as represented by arrow 16. Two paths are provided between the upstream end as at arrow 16 and the downstream segment as at arrow 17. The principal path, i.e., a series path, is identified by arrow 18, and an alternate parallel path is identified by arrow 19. Also included is conventional thermally actuated valve assembly 20 which includes a conventional thermally responsive actuator 21 and a pivotally connected gate member 22. As will be evident to those skilled in the art, the gate member 22 swings from the position in which it is shown through a 90 degree arc defined by curved arrow 23 as the engine cools off after being shut down. Thus, when the engine is cold, the gate member 22 occupies the vertical position defined by dashed line 24.

When in the position shown by dashed line 24 (i.e., when the engine is cold), the gate member 22 blocks flow of exhaust gasses through principal path 18a so that flow is diverted through alternate auxiliary path 19a and thence through a baffle 28 and an auxiliary combustion chamber 29, a ceramic foam member 30 and a channel 31 to principal path 18a. Thence it is transmitted past mixing the baffles represented by projections 32a and 32b to a conventional catalyst 33 of a catalytic converter 34 from whence it passes to a conventional muffler (not shown).

As mentioned above, the additional heat supplied to the exhaust gasses by a flame in the auxiliary combustion chamber 29 operates to hasten the elevation of temperature within the conventional catalyst 33 to its operative, or "light-off" temperature thus further enhancing the effectiveness of the system hereof during engine warm-up.

When the embodiment of FIG. 2 is employed, start-up of a cold engine results in the operation of a conventional actuator 21 to divert engine exhaust gasses during warm-up through alternate series path 19. At the same time, air and fuel are introduced to the auxiliary combustion chamber 29 through conventional ports represented schematically by a passageway 25, and conventional ignition circuits are activated to conduct ignition voltage to a conventional spark plug 35 to ignite the air-fuel mixture and produce an immediate flame within the chamber 29. By adjusting such air-fuel mixture to be somewhat lean, not only is a relatively hot flame produced but in addition provision is made for oxidizing some of the principal unburned engine exhaust products as they pass through the chamber 29 which encompasses the fuel and air injection port 25 and the spark plug 35.

The foam member 30 may be made of any of a variety of known conventional high temperature porous foams, preferably of high temperature thermal shock and oxidation resistant metallic or ceramic composition. For example, the foam member 30 may be formed of zirconia, alumina, silicon nitride, silicon carbide or other similar materials. If the foam member 30 is formed of an electrically conductive ceramic material, such as silicon carbide, it can serve as one electrode of an ignition system for igniting the fuel-air mixture in the chamber 30, as described below in greater detail.

It should be noted that utilization of a high temperature foam member to define the downstream boundary of combustion chamber 29 leads to several advantages including prevention of the flame front from extending beyond the chamber 29, dampening of exhaust pulsations, improving combustion chamber flame stabilization, flattening the temperature profile of the gas flow downstream of the chamber 29, and reducing catalyst face thermal shock. It has been discovered that a relatively thin foam member, for example on the order of about ¼in (3.2 mm) having a porosity of about 10 pores per inch is sufficient to provide these important advantages. However, thicker members could be used if desired to provide greater thermal mass without departing from the spirit and scope of the present invention.

Figure 3:
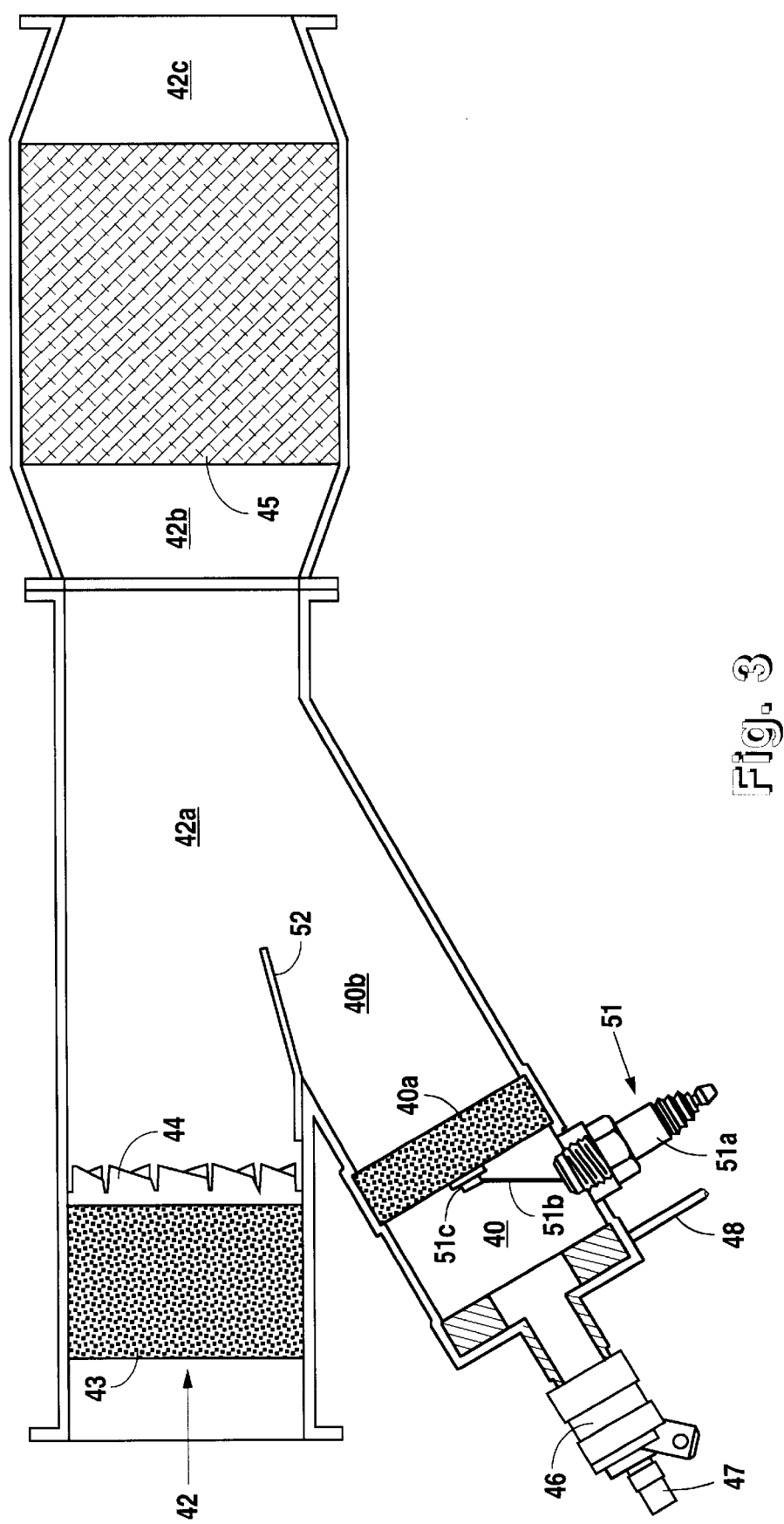
FIG. 3 is a cross section illustrating the preferred embodiment of the present invention in an internal combustion engine exhaust system.

Now turning to FIG. 3, illustrating the preferred embodiment of the present invention, an auxiliary combustion chamber 40 is connected in parallel with a portion of the engine exhaust pipe upstream of the catalyst. In this embodiment, the valving of FIG. 2 is eliminated and the auxiliary combustion chamber 40 of an auxiliary housing 41 is continuously interconnected through a ceramic foam member 40a and a chamber 40b with a chamber 42a of the principal exhaust gas path 42.

Interposed serially in a principal exhaust gas path 42 is an optional hydrocarbon trap 43 which may be employed to further improve responsiveness and early effectiveness of hydrocarbon neutralization. When used, the hydrocarbon trap 43 effectively absorbs engine out hydrocarbons (HC'S) until it reaches a predetermined temperature at which time the absorbed HC's are desorbed, thus providing for hydrocarbon control during the brief interval until the auxiliary flame member has reached operating temperature and the catalyst has reached its light-off temperature.

After passing through the trap 43, engine exhaust gasses continue through an optional exhaust swirl inducer 44 which creates turbulence that aids in mixing of the engine exhaust gasses with gasses exiting through the chamber 40b from the auxiliary combustion chamber 40. Such mixture of gasses then passes through a chamber 42b and the conventional catalyst 45 before exiting through a chamber 42c into a conventional tail pipe (not shown) and thence into the environment external to the engine 11.

Now returning to the auxiliary combustion chamber housing 41, it will be seen to be fitted with a conventional fuel injector 46 to which there is connected a fuel line 47 through which fuel such as gasoline is supplied. A source of air is provided through a channel 48 for introduction to the chamber 40 through conventional internal passageways (not shown).

As will be evident to those skilled in the art, fuel injected by the fuel injector 46 is ignited by an igniter 51 and continuously injected through the injector 46 into chamber 40 during a first predetermined period of time when the associated engine is cold started, thus providing a fueled burner that almost instantaneously creates an intensely hot flame within the chamber 40 which encompasses the fueled burner. The flame is confined within the chamber 40 by the ceramic foam member 40a, but the intensely hot gaseous products pass therethrough into the chamber 40b and thence mix with the engine exhaust in the downstream part of the chamber 42a and the chamber 42b to quickly heat the conventional catalyst 45.

By employing a ceramic foam member having a significant thermal mass and large surface areas, the foam member aids in fuel vaporization and re-ignition of the flame within the combustion chamber 40 if it should become extinguished and, as described above, improves the thermal distribution of gases exiting chamber 40, and helps reduce thermal shock on the catalyst. The ceramic foam member 40a also acts to reduce pulsations from the vehicle exhaust in the burner chamber 40, thereby isolating the mixing and flame structure in the burner chamber 40 from the vehicle exhaust 42.

An igniter 51 is seen preferably to include a spark plug shaped member 51a the central electrode of which is connected by a conductor 51b to an electrode 51c that is closely spaced from the foam member 40a which is formed of an electrically conductive material, such as silicon carbide, and is capable of supporting an electrical discharge therebetween to ignite the gasoline-air mixture within the chamber 40. Again, by making the surface area of the foam member 40a relatively large, a greater area is available to support electrical discharge between it and the electrode 51c of the igniter 51, thereby enhancing fuel ignition.

Although utilization of electrically conductive foam material and an electrode such as that of 51c is deemed preferable, it should be noted that if electrically nonconductive foam is employed, ignition similar to that of FIG. 2 would be employed. That is, a conventional spark plug could readily be utilized.

Also seen in FIG. 3 is a momentum deflector 52 that may be provided, if desired, to control the direction of flow of both the engine exhaust gasses passing laterally through the chamber 42a as well as the auxiliary combustion gasses passing through chamber 40b, thus preventing the flow through 40b from driving the combined flow to the far wall of 42a and unevenly heating catalyst 45.

As mentioned above, after the engine has been running long enough for its exhaust gas temperature to rise to a point at which catalytic light-off will be sustained, the supply of fuel to auxiliary chamber 40 is terminated. However, for a predetermined period of time which, depending on system parameters could be indefinite, air supply through channel 48 may continued, and the thermal mass of the ceramic foam member 40a provide a desirable source of heat for a significant period of time, thus contributing to smoothness of transfer of system operation from auxiliary (chamber 40) to principal (engine exhaust) heat sources. Such additional air also contributes to the effectiveness of catalytic oxidation of unburned hydrocarbons within the catalyst 45.

It will be recognized by those skilled in the art that the switching off of fuel to chamber 40 can readily be performed in accordance with a variety of known ways such as, for example, under control of a thermostat which measures temperature at the catalyst, monitoring of exhaust gas components, specified cycle time, and the like.

While the foregoing description envisions an internal combustion engine of the gasoline fueled variety, its principles are also applicable to diesel engines. Thus, the auxiliary flame sources may be connected within a diesel engine exhaust system to provide auxiliary heat to a diesel particulate trap to initiate regeneration and during cold-start to reduce white smoke. The objects and features of the invention thus are applicable also to internal combustion engines of the diesel type.

In applying the foregoing principles to diesel engines, it will be evident to those skilled in the art that the provision of supplementary heat as shown in FIG. 2 is referred to as an exhaust afterburner. Such could be utilized to reduce the aforementioned white smoke by reburning the engine exhaust in auxiliary combustion chamber 29 (FIG. 2). In such application the aforementioned air injection represented schematically at 25 may not be needed because diesel engines run lean, and there may be enough excess oxygen in the engine exhaust stream to sustain a flame in the afterburner chamber (e.g., chamber 29).

The foregoing systems may also be employed to initiate regeneration of a particulate trap by raising the exhaust temperature above the temperature necessary to burn the particulate that has accumulated in the trapping system. The burner activation could be initiated by a conventional measurement of engine back pressure which is indicative of trap loading.

The embodiment of FIG. 3 may also advantageously be employed in diesel engine applications. There, those skilled in the art will recognize the system as being a burner system which may be employed advantageously to initiate regeneration of the particulate trap.

It will also now be evident to those skilled in the art that there has been described herein an improved apparatus and method for increasing the stability and effectiveness of an auxiliary heat source by utilization of a ceramic foam member in a system for reducing undesirable internal combustion engine exhaust products during the period following engine cold start until a conventional catalyst has reached its light-off temperature.

It will also be noted that the foregoing auxiliary flame source may be connected to a diesel engine exhaust system to provide auxiliary heat for reducing white smoke and for heating a diesel particulate trap to initiate regeneration.

Although the invention hereof has been described by way of example of preferred embodiments, it will be evident that other adaptations and modifications can be employed without departing from the spirit and scope thereof. For example, different means for igniting auxiliary gasses could be employed.

As used in the appended claims, "treatment member" denotes both the aforementioned catalytic members and particulate traps. Furthermore, the fuel-air mixture port 25 shown in FIG. 2, and the fuel injector 46 shown in FIG. 3 are both representative of a "fueled burner" as used in the claims. In carrying out heating of the catalyst, or treatment member, upon start-up of the engine, the flame may be ignited either prior to, simultaneously with, or immediately after ignition of the engine. These relative time relationships between start-up the engine and ignition of the flame is defined herein and in the claims by the terms "coincidently" or "coincident with" each other.

The terms and expressions employed herein have been used as terms of description and not of limitation; and thus, there is no intent of excluding equivalents, but on the contrary it is intended to cover any and all equivalents that may be employed without departing from the spirit and scope of the invention.

What is claimed is:

1. A system for controlling undesirable emissions in gases exhausted from the exhaust port of an internal combustion engine during cold start-up of the engine, comprising:

(a) an exhaust gas treatment member interposed between the exhaust port of said engine and the environment external of said engine and adapted to treat unburned hydrocarbons in the exhaust gasses emitted by said internal combustion engine, said treatment member being heated by the exhaust gasses passing therethrough when said engine is hot;

(b) a chamber defined by wall surfaces interconnected with said exhaust gas treatment member at a position between the exhaust port of said engine and said exhaust gas treatment member and having a fueled burner disposed therein, said fueled burner being adapted to provide a flame coincidently with start-up of said engine; and, (c) a porous ceramic foam member defining at least one of said wall surfaces of said chamber and interposed between the fueled burner disposed within said chamber and said exhaust gas treatment member, said porous ceramic foam member simultaneously providing confinement of the flame within said chamber and passage of gases heated by the flame in said chamber to said exhaust gas treatment member.

2. A system for controlling undesirable emissions in gases exhausted from an internal combustion engine during cold start-up of the engine, as set forth in claim 1, wherein said porous ceramic foam member is formed of a ceramic material selected from the group consisting of alumina, zirconia, silicon nitride and silicon carbide.

3. A system for controlling undesirable emissions in gases exhausted from an internal combustion engine during cold start-up of the engine, as set forth in claim 1, wherein said porous ceramic foam member is formed of silicon carbide.

4. A system for controlling undesirable emissions in gases exhausted from an internal combustion engine during cold start-up of the engine, as set forth in claim 3, wherein said fueled burner includes an spark ignition member and said porous ceramic foam member provides an electrical charge transfer electrode for said spark ignition member.

5. A system for controlling undesirable emissions in gases exhausted from an internal combustion engine during cold start-up of the engine, as set forth in claim 1, wherein said chamber is controllably connected in serial communication with said exhaust gases when the temperature of said catalyst is less than a predetermined operating temperature and disabled when said catalyst is at a temperature at or above said predetermined operating temperature.

6. A system for controlling undesirable emissions in gases exhausted from an internal combustion engine during cold start-up of the engine, as set forth in claim 1, wherein said chamber is connected in parallel communication with said exhaust gases when the temperature of said catalyst is less than a predetermined operating temperature and disabled when said catalyst is at a temperature at or above said predetermined operating temperature.

7. A system for controlling undesirable emissions in gases exhausted from an internal combustion engine during cold start-up of the engine, as set forth in claim 1, wherein said system includes a means for controllably providing a supply of combustion air to said fueled burner.

8. A system for controlling undesirable emissions in gases exhausted from an internal combustion engine during cold start-up of the engine, as set forth in claim 7, wherein said means for controllably providing a supply of combustion air to said fueled burner includes continued delivery of an air supply to said fueled burner after the flame in said fueled burner is extinguished.

9. A cold start exhaust emission control system for an engine having an exhaust port, comprising:
   (a) an exhaust gas treatment member interconnected with said exhaust port;
   (b) a fueled burner disposed at a position between said engine exhaust port and said exhaust gas treatment member and adapted to provide a flame coincident with cold start-up of the engine;
   (c) a chamber defined by a plurality of wall surfaces and encompassing said fueled burner;
   (d) a porous ceramic foam member interposed between the fueled burner and said exhaust gas treatment member, said foam member defining at least one of said wall surfaces of the chamber encompassing the fueled burner, and simultaneously confining the flame provided by said fueled burner within said chamber and providing a passageway for gases heated by the flame in said chamber to the exhaust gas treatment member.

10. In an internal combustion engine cold start exhaust emission control system having an exhaust gas treatment member connected to said exhaust emission system for treatment of exhaust emitted by said internal combustion engine and a fueled burner for producing a flame for heating said treatment member during cold engine start-up, said fueled burner comprising:
   (a) a flame containment chamber having a plurality of walls and a fuel injector extending inwardly into said chamber through a preselected one of said walls;
   (b) an ignition device disposed within said chamber; and
   (c) a porous ceramic foam member defining one wall of said flame containment chamber and providing a flame holder to confine and stabilize said flame.

11. A method for improving the treatment of hydrocarbons in exhaust gases emitted from an internal combustion engine when said engine is cold started, comprising:
   (a) providing an enclosed passageway between an exhaust port of said engine and an environment external of said engine;
   (b) disposing an exhaust gas treatment member within said passageway;
   (c) disposing a fueled burner in a chamber having at least one wall formed of a porous ceramic foam material, said chamber being in fluid communication with said passageway and positioned between said exhaust port of the engine and said exhaust gas treatment member;
   (d) delivering fuel and air to said fueled burner coincident with cold starting said engine;
   (e) igniting said fuel to form a flame confined within said chamber, said flame heating gases within said chamber;
   (f) passing said flame-heated gases through said porous ceramic foam member;
   (g) directing said exhaust gas to said passageway; and,
   (h) mixing said flame-heated gases with said exhaust gases and directing said mixture of flame-heated gases and engine exhaust gases through said exhaust gas treatment member.

12. A method for improving the treatment of hydrocarbons in exhaust gases as set forth in claim 11, wherein said method includes extinguishing the flame in said fueled burner when said treatment member has reached a predetermined temperature.

13. A method for improving the treatment of hydrocarbons in exhaust gases, as set forth in claim 12, wherein said predetermined temperature is a light-off temperature of said treatment member.

14. A method for improving the treatment of hydrocarbons in exhaust gases, as set forth in claim 11, wherein said method includes extinguishing said fueled burner a predetermined period of time after igniting said fueled burner.

* * * * *